(12) United States Patent
Nakamura et al.

(10) Patent No.: US 6,811,087 B2
(45) Date of Patent: Nov. 2, 2004

(54) BARCODE SCANNER

(75) Inventors: Norio Nakamura, Yokohama (JP); Nobuyasu Goto, Yokohama (JP); Takaaki Shimizu, Tokyo (JP); Yutaka Ichinohe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 40 days.

(21) Appl. No.: 10/410,395

(22) Filed: Apr. 10, 2003

(65) Prior Publication Data

US 2004/0004127 A1 Jan. 8, 2004

(30) Foreign Application Priority Data

Apr. 12, 2002 (JP) ....................................... 2002-110852

(51) Int. Cl.[7] ................................................. G06K 7/10
(52) U.S. Cl. ............................. 235/462.26; 235/462.25; 235/462.27
(58) Field of Search ....................... 235/462.25, 462.26, 235/462.27

(56) References Cited

U.S. PATENT DOCUMENTS

| | | | | | |
|---|---|---|---|---|---|
| 4,360,798 A | * | 11/1982 | Swartz et al. | .......... | 235/462.27 |
| 4,682,015 A | * | 7/1987 | Quan | .................... | 235/462.27 |
| 5,436,440 A | * | 7/1995 | Barkan | .................. | 235/462.27 |
| 5,484,995 A | * | 1/1996 | Scofield et al. | ........ | 235/462.37 |
| 5,545,888 A | * | 8/1996 | Barkan et al. | .......... | 235/462.27 |
| 5,581,072 A | * | 12/1996 | Bridgelall et al. | ..... | 235/462.25 |
| 5,929,419 A | * | 7/1999 | Rockstein et al. | ..... | 235/462.27 |
| 6,176,429 B1 | * | 1/2001 | Reddersen et al. | .... | 235/462.25 |
| 6,505,778 B1 | * | 1/2003 | Reddersen et al. | .... | 235/462.26 |

FOREIGN PATENT DOCUMENTS

| | | |
|---|---|---|
| JP | 4-177582 | 6/1992 |
| JP | 4-346184 | 12/1992 |

* cited by examiner

Primary Examiner—Karl D. Frech
Assistant Examiner—Uyen-Chau N. Le
(74) Attorney, Agent, or Firm—Oblon, Spivak, McClelland, Maier & Neustadt, P.C.

(57) ABSTRACT

A barcode scanner comprising a laser driving circuit to drive a laser by a pulse signal generated by an oscillator, a preamplifier to amplify a voltage of a barcode signal from a photodetector corresponding to a reflected light from a barcode scanned by a light output of the laser driven by the pulse signal, a high-pass filter to remove a direct current component contained in an output signal of the preamplifier, a variable gain amplifier which controls an amplification gain of an output signal of the high-pass filter and performs automatic gain control to set an output level almost constant, a synchronous detector to detect a pulse signal contained in an output signal of the variable gain amplifier in synchronization with the output pulse of the oscillator, and a binarization circuit to binarize an output signal of the synchronous detector.

21 Claims, 8 Drawing Sheets

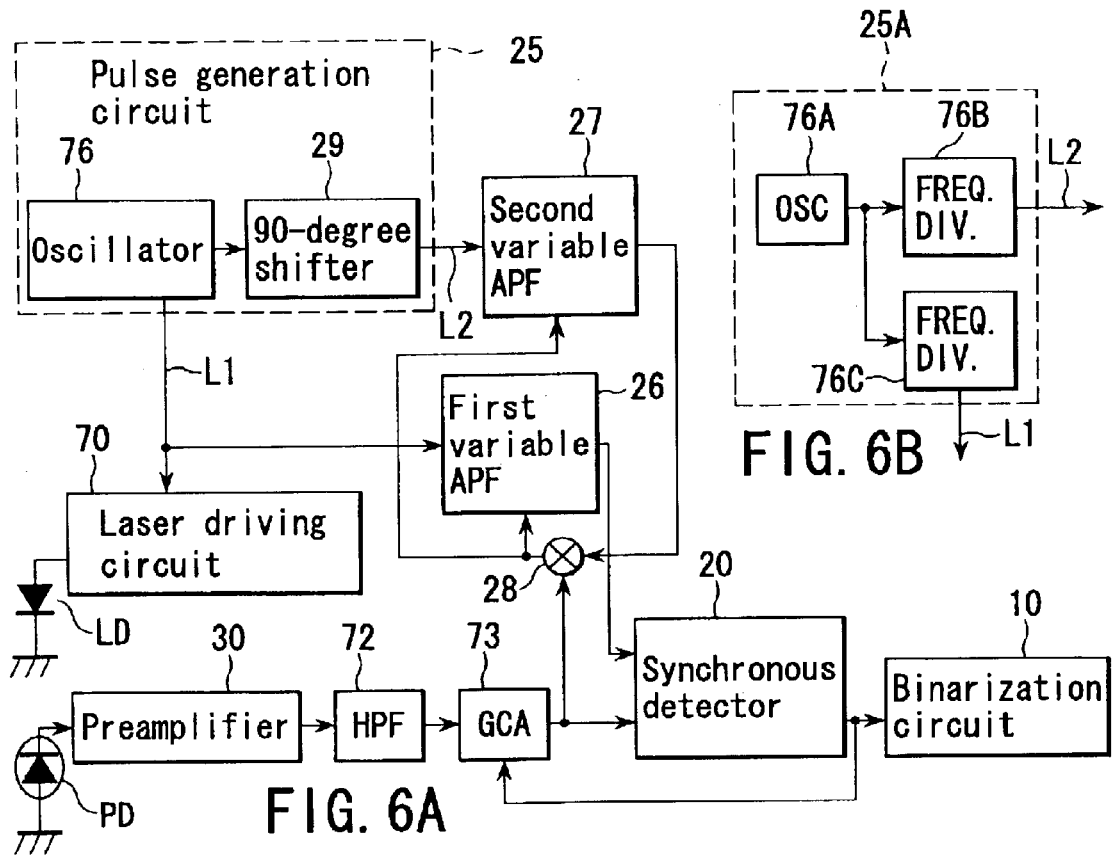
FIG. 6A
FIG. 6B
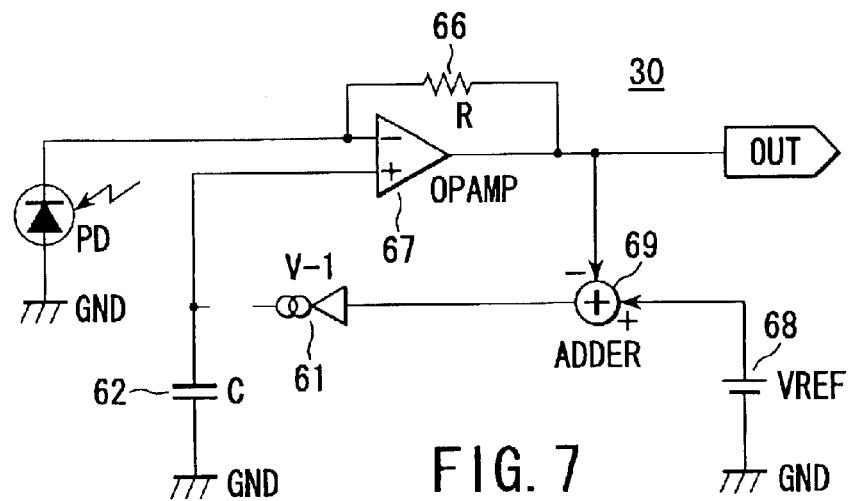
FIG. 7

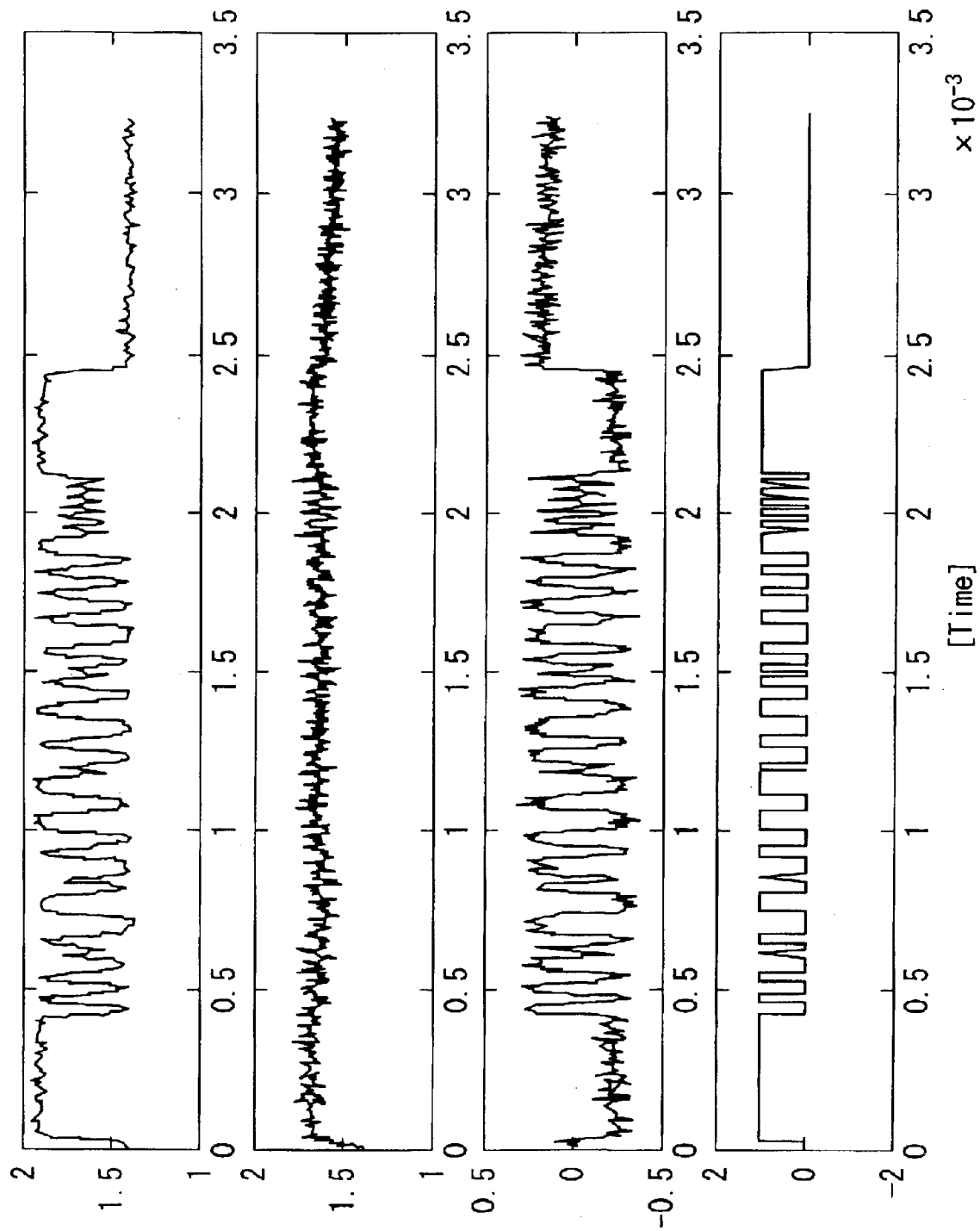

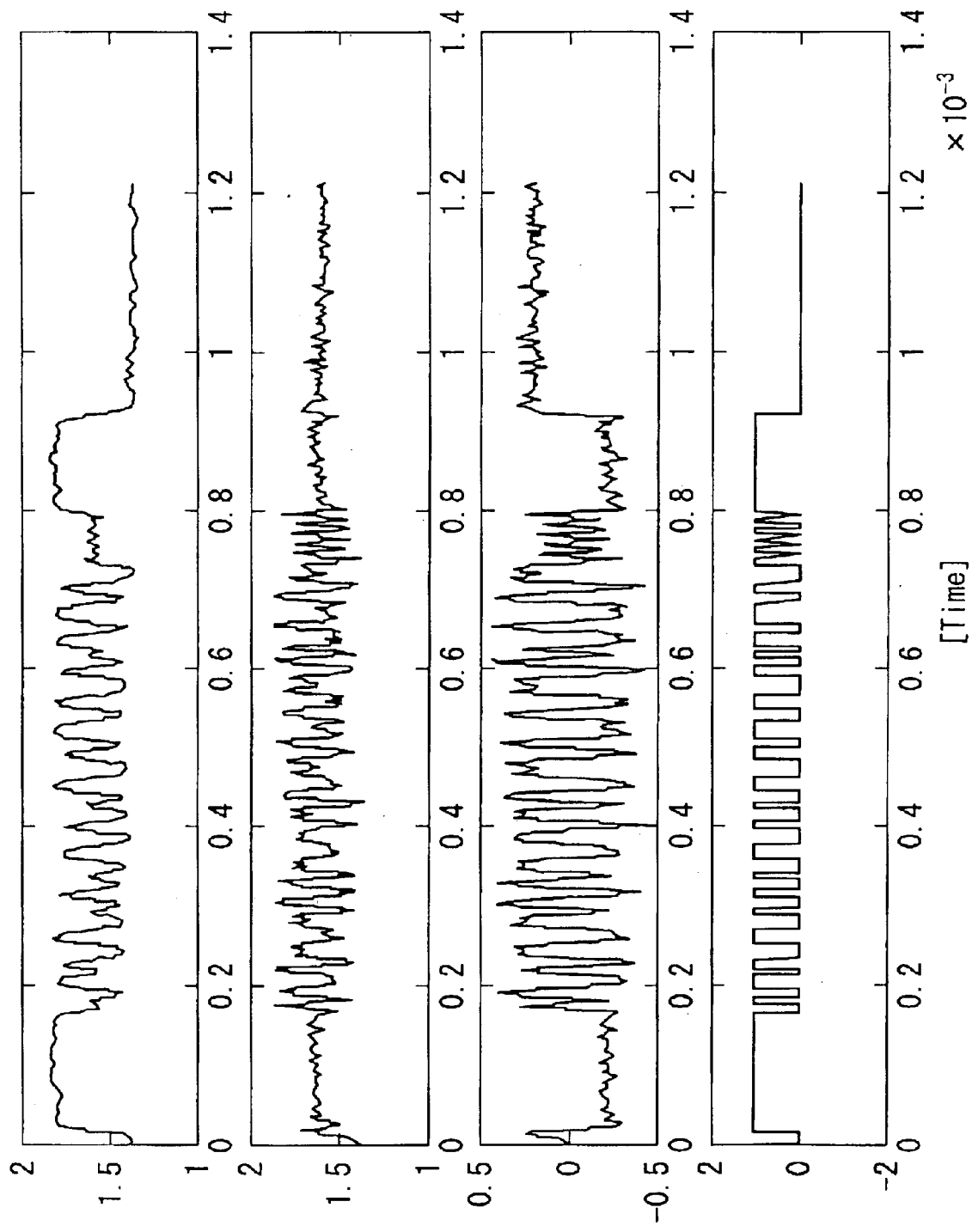

BARCODE SCANNER

CROSS-REFERENCE TO RELATED APPLICATIONS

This application is based upon and claims the benefit of priority from the prior Japanese Patent Application No. 2002-110852, filed on Apr. 12, 2002, the entire contents of which are incorporated herein by reference.

BACKGROUND OF THE INVENTION

1. Field of the Invention

The present invention relates to a barcode scanner, and more particularly, to a barcode scanner comprising a processing circuit for an electric signal generated from a light reflected from a barcode scanned with a laser beam generated by pulse driving.

2. Description of the Related Art

A barcode scanner of a laser scanning system uses a laser diode as a light source, scans its emission output on barcode information (pattern) by a scanning mirror, reads intensity of a reflected light from a barcode by a photodetector, so that a barcode signal corresponding to the barcode information is obtained.

For example, Jpn. Pat. Appln. KOKAI Publication No. 4-177582 discloses a technology for maintaining an amount of a reflected light from a barcode label surface at a constant level by controlling a driving current of a laser diode in accordance with the amount of a laser beam reflected from the barcode label surface.

However, an output signal obtained in accordance with the amount of the laser reflected beam contains a DC offset component caused by an ambient light such as sunlight in addition to a barcode signal. Thus, as in the case of a black part of a barcode, the DC offset component is relatively enlarged in a place where a reflected light is small and amplitude of a received signal becomes small, which reduces reading accuracy of the barcode.

Further, while the DC offset component and a noise signal level contained in an input signal is almost constant, the intensity of the reflected light from the barcode is inversely proportional to a distance between the barcode and the laser light source, i.e., a square of a distance between the barcode and the scanner, and thus detected signal intensity is lower as a distance is larger.

Therefore, it is necessary to set a signal gain higher as a distance is larger, but an offset of a detected signal output due to noise or the like is also enlarged. While there is a demand for increasing the readable distance between the barcode and the scanner, a problem of difficulty of making the maximum readable distance long occurs.

There is also a demand for a faster barcode reading speed. However, if a barcode scanning speed by a laser beam is increased, a problem that amplitude of a detected signal becomes smaller occurs. To deal with this problem, for example there is an invention disclosed in Jpn. Pat. Appln. KOKAI Publication No. 4-346184.

According to this conventional technology, it is possible to obtain a binarized signal where the DC offset due to the disturbance light and the influence of the noise component are removed. However, since this conventional technology does not deal with fluctuation in a frequency component of a barcode detected signal inputted to a binarization circuit caused by distance between the barcode and the scanner or thickness of bars and blanks in barcode pattern, barcode information may not be read correctly. Consequently, as described above, while there is a demand for an increase of a readable distance between the barcode and the scanner, the readable distance cannot be increased, thereby disabling the performance improvement of the barcode scanner.

Generally, a reflected light from a barcode which is an object of the barcode scanner is weaker as a distance between the barcode and the scanner is longer, and a high frequency component contained in the barcode detected signal is increased. The frequency component of the reflected light from the barcode depends not only on the distance between the barcode and the scanner but also on a pattern interval (thickness of bars and blanks in barcode pattern) of a barcode print, and varies depending on an angular velocity of a light source for scanning on the object.

Frequency characteristics of the conventional binarization circuit of the aforementioned constitution are fixed, and frequency characteristics of its signal processing are fixed. Thus, if a frequency component of an inputted barcode signal fluctuates due to a distance between the barcode and the scanner or thickness of bars and blanks in a barcode pattern, there is a possibility of a problem of deviation of signal processing characteristics from optimal conditions to deal with fluctuation in the frequency component.

BRIEF SUMMARY OF THE INVENTION

A barcode scanner according to one aspect of the present invention comprises: a first oscillator to generate a pulse signal of a predetermined frequency; a laser driving circuit to pulse-drive a laser by the pulse signal generated from the first oscillator; and a signal processing section which detects a reflected light signal from a barcode scanned by an emission output of the laser to generate a binarized signal corresponding to the barcode, wherein the signal processing section includes: a preamplifier to convert, into a voltage signal, a current-converted barcode signal outputted from a photodetector which detects the reflected light from the barcode scanned by the emission output of the laser, and to supply an amplified voltage signal; a high-pass filter to remove a direct current component contained in the amplified voltage signal from the preamplifier; a variable gain amplifier which controls an amplification gain of an output signal of the high-pass filter, thereby carrying out automatic gain control so as to set an output level almost constant, a synchronous detector to detect a pulse signal contained in an output signal of the variable gain amplifier in synchronization with the pulse signal generated from the first oscillator, and a binarization circuit to binarize an output signal of the synchronous detector.

BRIEF DESCRIPTION OF THE SEVERAL VIEWS OF THE DRAWING

FIG. 6A is a block diagram of a barcode scanner having yet another specific example of the phase compensation circuit of FIG. 3.

FIG. 6B is a block diagram showing a modified configuration of the pulse generation circuit shown in FIG. 6A.

FIG. 7 is a circuit diagram showing an example of a preamplifier of FIG. 1.

FIG. 13A is a view showing a waveform example of an output signal of the LPF of FIG. 10 when a barcode signal of a low frequency shown in FIG. 12A is inputted.

FIG. 13B is a view showing a waveform example of an output signal of the BPF of FIG. 10 when the barcode signal of the low frequency shown in FIG. 12A is inputted.

FIG. 13C is a view showing a waveform example of an output signal of an adder of FIG. 10 when the barcode signal of the low frequency shown in FIG. 12A is inputted.

FIG. 13D is a view showing a waveform example of an output signal of a comparator of FIG. 10 when the barcode signal of the low frequency shown in FIG. 12A is inputted.

FIG. 14A is a view showing a waveform example of an output signal of the LPF of FIG. 10 when a barcode signal of a high frequency shown in FIG. 12B is inputted.

FIG. 14B is a view showing a waveform example of an output signal of the BPF of FIG. 10 when the barcode signal of the high frequency shown in FIG. 12B is inputted.

FIG. 14C is a view showing a waveform example of an output signal of the adder of FIG. 10 when the barcode signal of the high frequency shown in FIG. 12B is inputted.

FIG. 14D is a view showing a waveform example of an output signal of the comparator of FIG. 10 when the barcode signal of the high frequency shown in FIG. 12B is inputted.

DETAILED DESCRIPTION OF THE INVENTION

Next, preferred embodiments of the present invention will be described in detail with reference to the accompanying drawings.

[First Embodiment]

Figure 1:
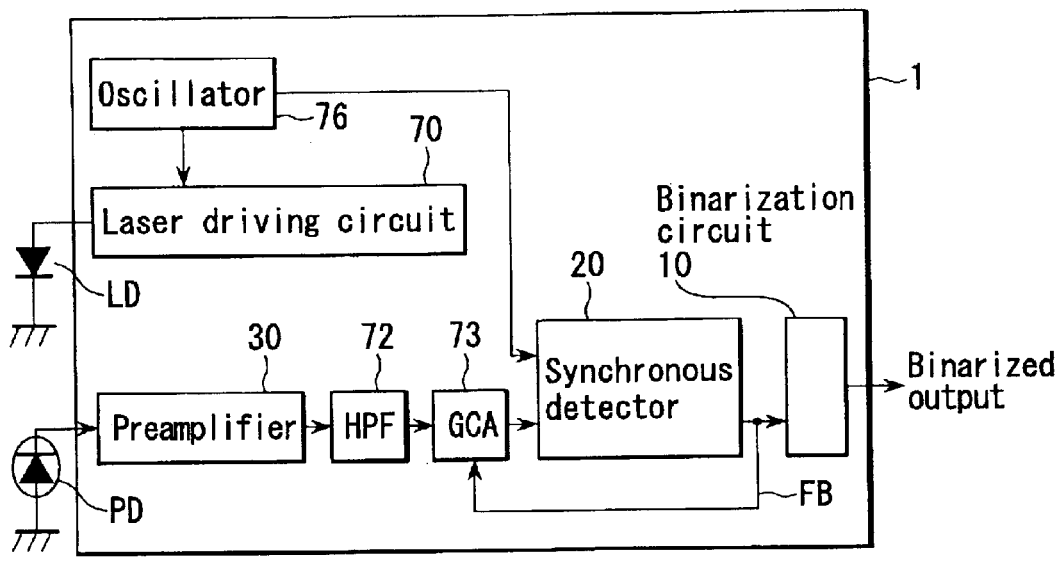
FIG. 1 is a block diagram schematically showing an entire constitution of a barcode scanner according to a first embodiment of the present invention.

FIG. 1 schematically shows an entire constitution of a barcode scanner according to a first embodiment of the present invention.

In FIG. 1, a laser drive section includes an oscillator 76 for generating, for example, a pulse signal of about 2 MHz, and a laser driving circuit 70 for pulse-driving a laser diode LD by an output pulse of the oscillator 76. Normally, an automatic power control circuit (not shown) is employed in order to control output power of the laser diode LD at a predetermined fixed level.

Figure 2A:
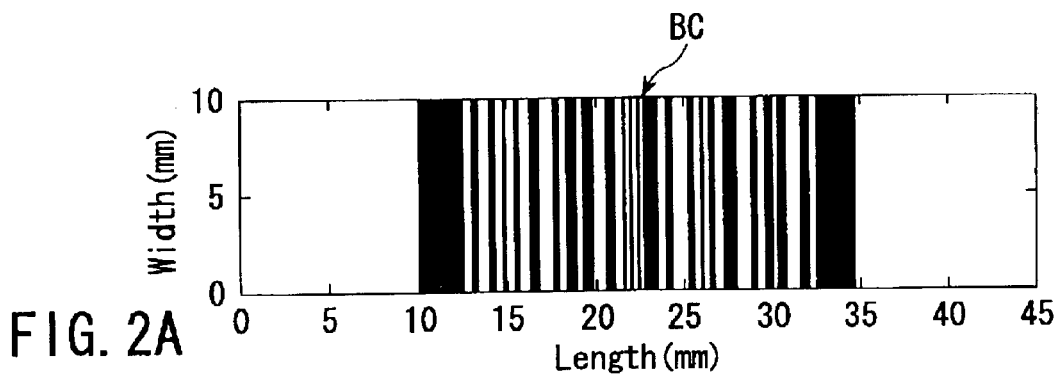
FIG. 2A is a view showing an example of a barcode pattern which is a target of the barcode scanner of FIG. 1.

A pulsed laser beam from the laser diode LD scans, for example, a barcode BC of a length 25 mm and a width 10 mm shown in FIG. 2A at a predetermined fixed speed. A photodetection section for receiving a reflected light from the barcode BC includes a photodetector PD which detects the reflected light from the barcode BC to output a current signal. The output current signal of the photodetector PD is supplied to a signal processing section 1.

Figure 2B:
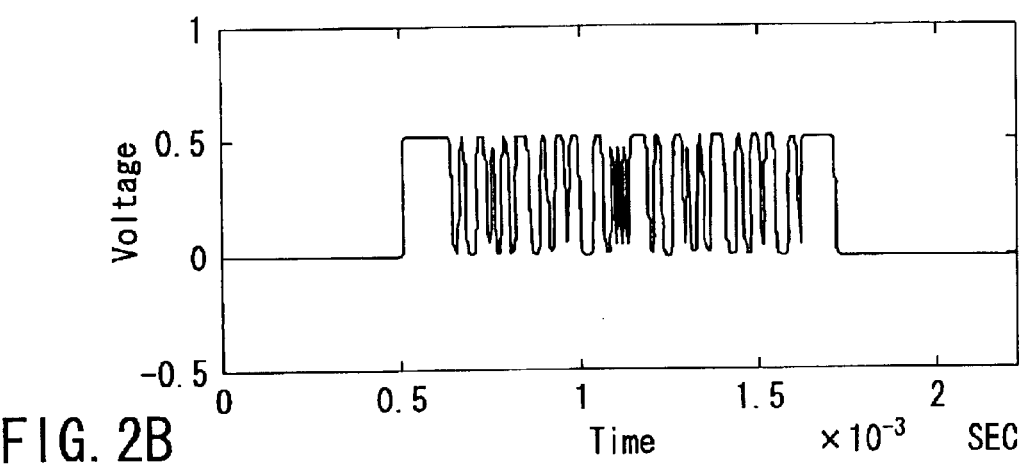
FIG. 2B is a signal waveform showing an example of a signal obtained by scanning a barcode of FIG. 2A by a laser beam, subjecting its reflected light to current conversion at a photodetector, and further subjecting it to voltage conversion.

The signal processing section 1 includes a preamplifier 30 for converting the output current signal or the barcode signal detected by the photodetector PD into a voltage signal similar to that shown in FIG. 2B corresponding to white and black parts of the barcode BC and amplifying the signal. The waveform of in FIG. 2B does not show the pulse signal component corresponding to the output pulse of the oscillator 76 for simply showing the waveform corresponding to the black and white bars of the barcode BC.

The signal processing section 1 further comprises a high-pass filter (HPF) 72 for removing a direct current portion contained in an output signal of the preamplifier 30, a gain control amplifier (GCA) 73 for controlling an amplification gain for an output signal of the HPF 72, a synchronous detector 20 for detecting the pulse signal of about 20 MHz contained in an output signal of the GCA 73 in synchronization with the output pulse of the oscillator 76, and a binarization circuit 10 for binarizing an output signal of the synchronous detector 20. In this case, in order to make an output level of the synchronous detector 20 almost constant, a feedback loop FB is formed for executing an automatic gain control (AGC) to control a gain of the GCA 73 in accordance with the output level of the synchronous detector 20.

In the signal processing section 1 of the barcode scanner of FIG. 1, the synchronous detector 20 is used to detect the output signal of the GCA 73 in synchronization with the output signal of the oscillator 76 of the laser drive section. In this case, preferably, control circuits (not shown) or the like for controlling the oscillator 76, the laser driving circuit 70, the signal processing section 1 and a mirror driving system for scanning a laser beam across the barcode BC are formed on one semiconductor chip 1, and the entire constitution is miniaturized and costs are reduced by supplying the output pulse of the oscillator 76 to the synchronous detector 20 on the same chip 1. If an external oscillator such as a crystal oscillator is designed to be mounted on the chip 1 as the oscillator 76, a circuit portion of the oscillator 76 is also formed on the same chip 1 as that of the synchronous detector 20.

Not only the components of the first embodiment of FIG. 1, but also corresponding portions of all the following embodiments can be formed on the same chip.

Main input noise is a white noise generated at the photodetector PD and the preamplifier 30. When the output signal of the GCA 73 is detected in synchronization with the output signal of the oscillator 76, only a frequency component identical to an oscillation frequency of the oscillator 76 among frequency components of the input noise appears in a detected output. Thus, almost all offsets of the detected output due to the input noise can be ignored.

[Second Embodiment]

Figure 3:
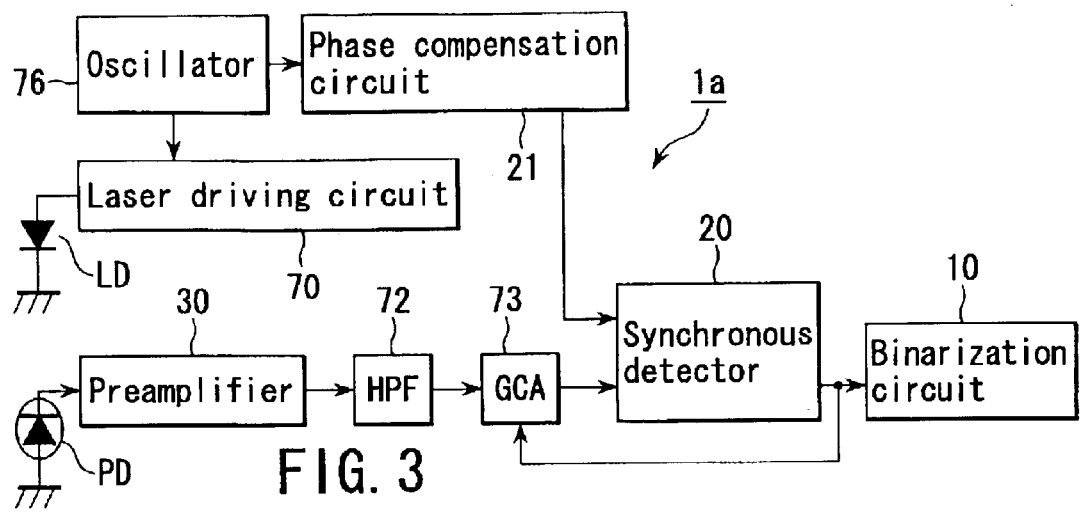
FIG. 3 is a block diagram showing a constitution of another embodiment of the present invention.

FIG. 3 shows another embodiment of the present invention where the signal processing section 1 of FIG. 1 is partially modified.

This signal processing section 1a is different from that 1 of FIG. 1 in that the output signal of the oscillator 76 is inputted through a phase compensation circuit 21 to the synchronous detector 20. Other portions are similar, and thus denoted by similar reference numerals of FIG. 1.

The phase compensation circuit 21 shifts a phase of an input signal from the oscillator 76 by an amount equal to a sum of a delay amount of the preamplifier 30, the HPF 72, and the GCA 73 so that two input signals of the synchronous detector 20 from the oscillator 76 and from the GCA 73 have the same phases.

By adding such a phase compensation circuit 21, phases of the two inputs of the synchronous detector 20 are accurately matched with each other to increase detection efficiency more.

Figure 4:
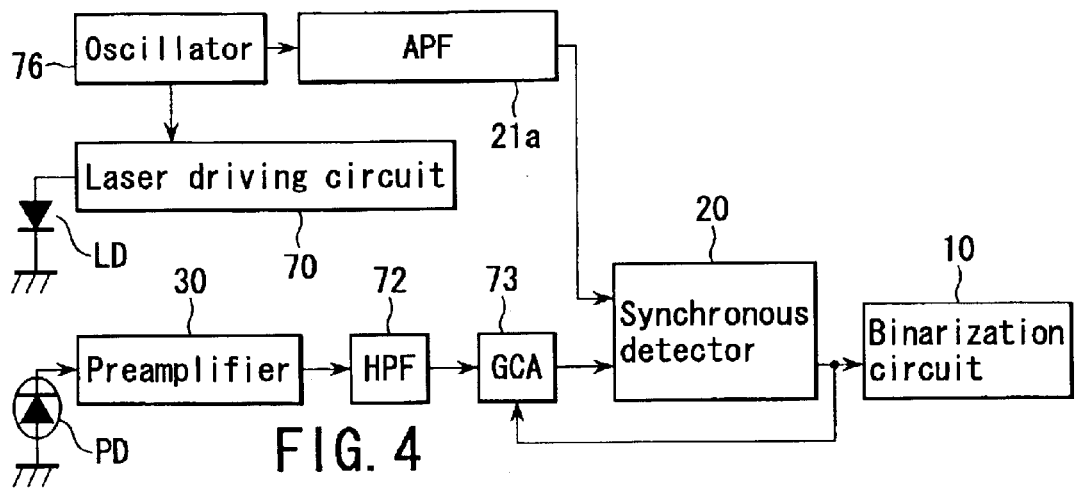
FIG. 4 is a block diagram of a barcode scanner having a specific example of a phase compensation circuit of FIG. 3.

FIG. 4 shows a block diagram showing a barcode scanner having a specific example of the phase compensation circuit 21 of FIG. 3.

In this example, an all-pass filter (APF) 21a of a fixed cutoff frequency constitutes the phase compensation circuit 21 of FIG. 3.

Frequency characteristics of the preamplifier 30 and the HPF 72 are fixed, and frequency characteristics of the GCA 73 are almost fixed as well while its gain is variable. Thus, the phase compensation circuit 21 can also be realized by the APF 21a of fixed frequency characteristics.

Figure 5:
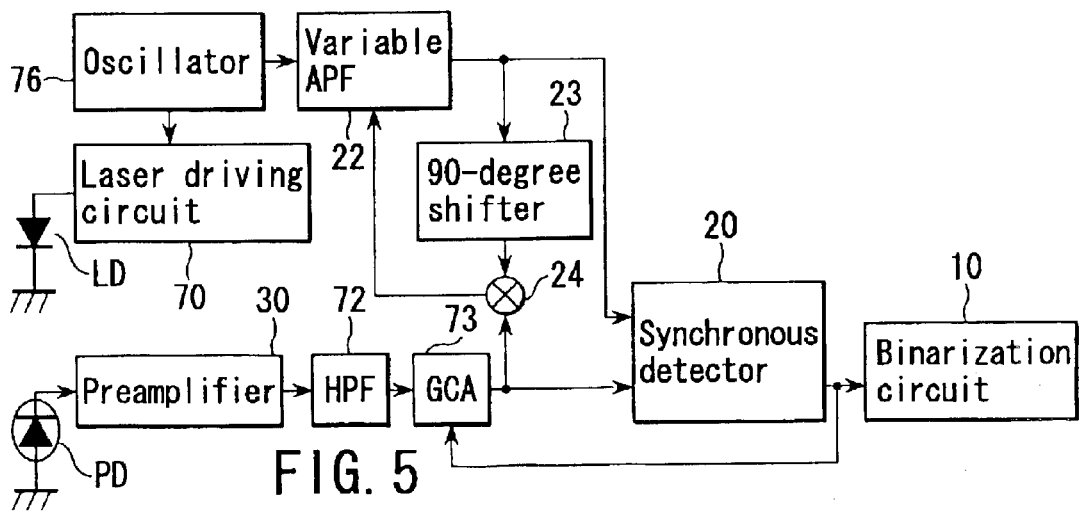
FIG. 5 is a block diagram of a barcode scanner having another specific example of the phase compensation circuit of FIG. 3.

FIG. 5 shows a block diagram of a barcode scanner having another specific example of the phase compensation circuit 21 of FIG. 3.

In this example, the phase compensation circuit is constituted of a variable APF 22 to which the output signal of the oscillator 76 is inputted and in which a cutoff frequency thereof is variable, and a 90-degree phase shifter 23 for shifting a phase of an output of the variable APF 22 by 90° in an analog circuit so that when an output of the 90-degree shifter 23 and the output of the GCA 73 are multiplied by a multiplier 24, the cutoff frequency of the variable APF 22 may be controlled so as to set a result of the multiplication to 0.

Here, the multiplication result of the multiplier 24 is 0, when a total delay in the circuits 30, 72 and 73 is 0 and a phase difference between two inputs of the multiplier 24 is 90°. At this time, phases of the outputs of the variable APF 22 and the GCA 73 which are inputs to the synchronous detector 20 coincide with each other, and no output for varying the cutoff frequency is supplied to the control terminal of the variable APF 22.

On the other hand, when a signal delay through the circuits 30, 72 and 73 occurs, the phase difference between two inputs of the multiplier 24 is not 90°, and a control signal having a voltage value corresponding to the signal delay of the circuits 30, 72 and 73 is supplied to the variable APF 22 to bring the output from the multiplier 24 zero.

FIG. 6 shows a barcode scanner having yet another specific example of the phase compensation circuit 21 of FIG. 3.

In this configuration, the phase compensation circuit 21 is constituted of a pulse generation circuit 25 including a pulse oscillator 76 for outputting a first pulse signal to a signal line L1 and a 90-degree phase shifter 29 for outputting a second pulse signal to a signal line L2. The output pulse of the oscillator 76 or the first pulse signal is delayed by 90° in the shifter 29. The first pulse signal on the line L1 is inputted to a first variable APF 26 having a cutoff frequency variable, and the second pulse signal on the line L2 is inputted to a second variable APF 27 having a cutoff frequency variable in conjunction with that of the first variable APF 26. An output of the second variable APF 27 and the output of the GCA 73 are supplied to a multiplier 28 to obtain a multiplication output. The multiplication output of the multiplier 28 is supplied to control terminals of the variable APFS 26 and 27, so that the cutoff frequency of the first variable APF 26 and the cutoff frequency of the second variable APF 27 are controlled in conjunction so as to set a result of the multiplication at the multiplier 28 to 0.

Here, the multiplication result of the multiplier 28 is 0 when a phase difference between two inputs of the multiplier 28 is 90°. At this time, phases of the outputs of the first variable APF 26 and the GCA 73 which are inputs to the synchronous detector 20 coincide with each other. Thus, even if a time delay occurs at the output of the GCA 73 in comparison with the output phase of the signal on the line L1, the output phases of the variable APFS 26, 27 are controlled so that the multiplication result of the multiplier 28 becomes 0.

The pulse generation circuit 25 shown in FIG. 6A is constituted of the oscillator 76, and the 90-degree shifter 29 for shifting the output signal of the oscillator 76 by 90° in an analog circuit.

Further, as shown in FIG. 6B, a pulse generation circuit 25A may also be used, in which an oscillator 76A outputting a pulse signal having a frequency twice as large as an oscillation frequency outputted from the oscillator 76 of FIG. 6A, and two frequency division circuits 76B, 76C for frequency-dividing the output signal of the oscillator 76A into two, are provided. One frequency division circuit 76B is configured to output a first frequency-division signal on the line L2 in synchronism with a falling edge of the oscillator 76A output, and the other frequency division circuit 76C is configured to output a second frequency-division signal on the line L1 in synchronism with a rising edge of the oscillator 76A output. Thus, it is possible to generate two pulse signals having 90-degree different phases on the lines L1 and L2 different in phase by 90° very easily.

FIG. 7 shows an example of a practical circuit constitution of the preamplifier 30 shown in FIG. 1.

In FIG. 7, the preamplifier 30 comprises an operational amplifier 67 where the output signal of the photodetector PD is inputted to an inversion input node, and a feedback resistor 66 with a resistance value R connected between an output node and the inversion input node of the operational amplifier 67.

The preamplifier 30 further comprises a reference voltage source 68 generating a reference voltage VREF and an adder 69 configured to add an output signal of the operational amplifier 67 and the reference voltage VREF together to detect a level of the output signal of the operational amplifier 67. Namely, the reference voltage source 68 and the adder 69 constitute an offset detector.

A voltage/current (V-I) converter 61 generates a current having a value corresponding to a DC component or an equivalent to a DC offset voltage of the output of the operational amplifier 67 contained in an output signal of the adder 69, and its output node is connected to a noninversion input node of the operational amplifier 67.

Further, a capacitor 62 is connected between a noninversion input node of the operational amplifier 67 and a ground node, and has a role to lastly take out the DC component contained in the output signal of the operational amplifier 67 or the preamplifier 30. In this case, preferably, for example, the capacitor 62 may be disposed outside the semiconductor integrated circuit chip 1, to have a sufficiently large capacity value whereby a cutoff frequency of an LPF formed of the capacitor 62 is set at a very low value.

Then, by charging/discharging the capacitor 62 using a current converted by the voltage/current converter 61, a reference voltage for the operational amplifier 67 is generated by the capacitor 62 and applied to the non-inversion input of the operational amplifier 67.

Next, an operation of the preamplifier 30 of FIG. 7 will be described.

At the preamplifier 30, a signal where a noise signal component N generated due to an ambience light such as sunlight is superposed as a DC offset is inputted from the PD in addition to a barcode signal S, and the input signal is subjected to current/voltage conversion and amplification to be outputted. This preamplifier output signal is added to the reference voltage VREF at the adder 69, and the voltage level of the output from the operational amplifier 67 is detected.

An output voltage of the adder 69 is converted into a current by the voltage/current converter 61, and the capacitor 62 is charged/discharged in accordance with an amount of this current. In this case, the capacitor 62 forms the LPF of a sufficiently low cutoff frequency, and the DC component (equivalent to a DC offset voltage of the preamplifier 30 output) contained in the output of the adder 69 is detected. The charging/discharging of the capacitor 62 by the output current of the V-I converter 61 causes the reference voltage of the operational amplifier 67 to vary, whereby an offset voltage of the preamplifier output is canceled.

Figure 8:
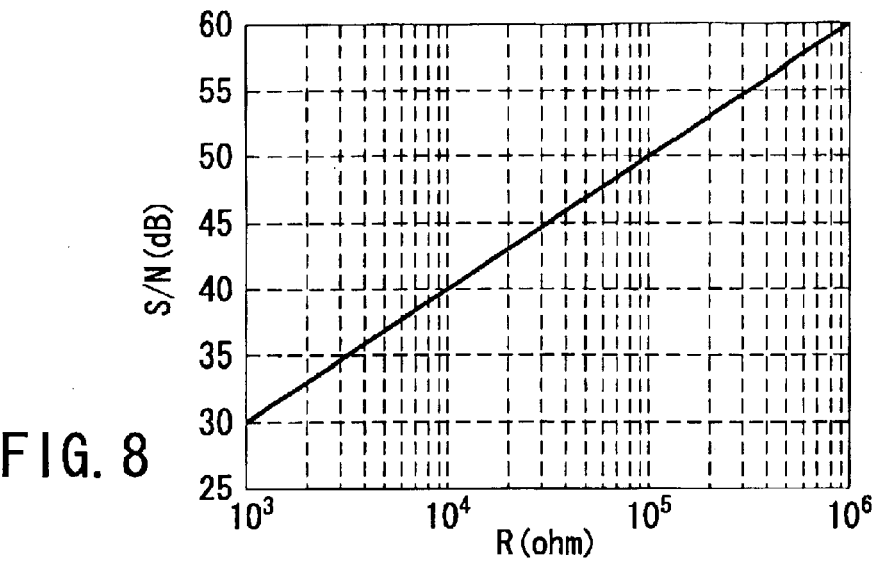
FIG. 8 is a graph showing a relation characteristic between feedback resistance of the preamplifier of FIG. 7 and an S/N of an output.

By the aforementioned operation, no offsets appear in the output of the preamplifier 30, a constant DC level is maintained, thereby secured a wide dynamic range of the preamplifier 30. Accordingly, a limitation on the resistance value R of the feedback resistor 66 is moderated and, by setting the resistance value R higher, a preamplifier 30 of high S/N can be realized as can be understood from FIG. 8.

Figure 9:
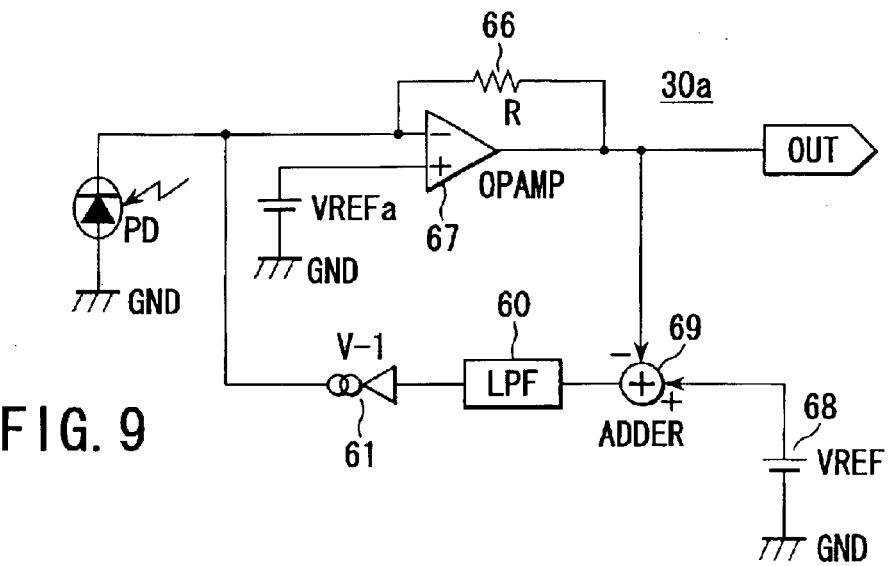
FIG. 9 is a circuit diagram showing another example of the preamplifier of FIG. 1.

FIG. 9 is a block diagram showing another example of the preamplifier 30 of FIG. 1.

The preamplifier 30a shown in FIG. 9 is similar to the preamplifier 30 of the first example described above with reference to FIG. 7 having the operational amplifier 67, feedback resistor 66, the reference voltage source 68, the adder 69, and the voltage/current converter 61. The circuit configuration shown in FIG. 9 is different from that of the circuit shown in FIG. 7 in the following points.

(1) The capacitor 62 in FIG. 7 connected between the output node of the voltage/current converter 61 and the ground node is omitted, and the output node of the voltage/current converter 61 is connected to the inversion input node of the operational amplifier 67. Another reference voltage VREFa is directly supplied to the non-inversion input node of the operational is amplifier 67.

(2) In place of the omitted capacitor 62 of FIG. 7, an LPF 60 having a cutoff frequency set as low as possible is inserted into the output side (or input side) of the adder 69 to take out a DC component equivalent to the DC offset voltage of the preamplifier output signal.

According to the preamplifier 30a of the second example, an offset current included in the output of the PD is canceled by a conversion current outputted from the voltage/current converter 61, and a wide dynamic range of the preamplifier 30a is secured, whereby effects similar to those of the preamplifier 30 of the first example shown in FIG. 7 can be obtained.

Figure 10:
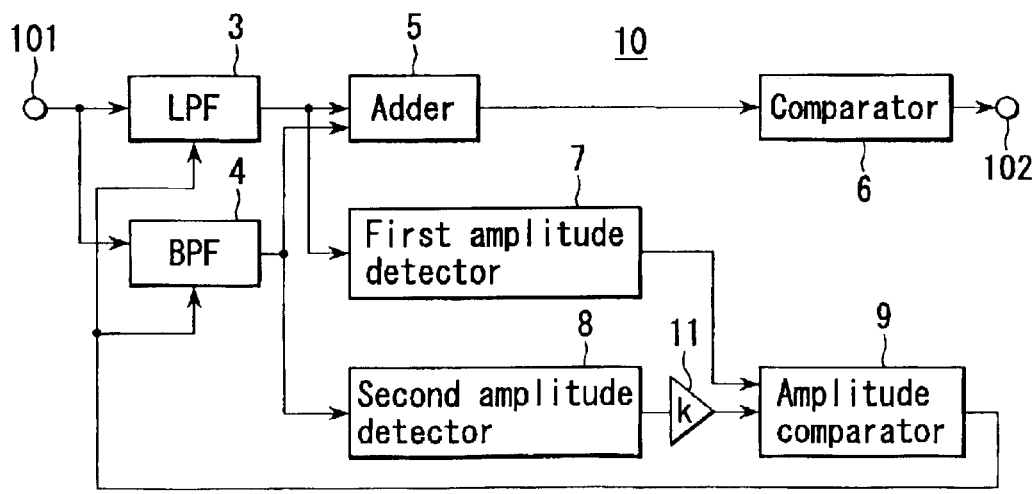
FIG. 10 is a block diagram showing a specific example of a binarization circuit of FIG. 1.

FIG. 10 shows a specific example of the binarization circuit 10 of FIG. 1.

This binarization circuit 10 receives a barcode read signal outputted from the synchronous detector 20 of FIG. 1 at an input terminal 101, binarizes the input signal, and outputs the binarized signal to an output terminal 102.

The binarization circuit 10 comprises two variable filters 3, 4 capable of changing frequency characteristics for the input signal, two amplitude detectors 7, 8 for correspondingly detecting amplitude of output signals of the two variable filters 3, 4, an amplitude comparator 9 for comparing a detected output of the amplitude detector 7 with that of the amplitude detector 8 obtained via an amplitude regulator 11, outputting a control signal in accordance with a difference thereof, and controlling the frequency characteristics of the two variable filters 3, 4 based on an output of the comparison at the comparator 9, an adder 5 for detecting an amplitude difference between the output signals of the two variable filters 3, 4, and a comparator 6 for outputting a binarized output signal based on the output of the adder 5.

In this case, the binarization circuit 10 is constituted so that the two amplitude detectors 7, 8 can be, for example, equal in detected amplitude. In other words, cutoff frequencies of the variable filters 3 and 4 can be controlled in accordance with a frequency component of an input signal so as to bring the two amplitude detected outputs are equal.

As the two variable filters 3, 4, a LPF 3 which passes a low-band component of the input signal in accordance with a control signal from the amplitude comparator 9, and a BPF 4 which passes a predetermined frequency band component of the input signal in accordance with the control signal from the amplitude comparator 9 are used in the example shown in FIG. 10. Here, the LPF 3 and the BPF 4 are designed to have characteristics which are similar in characteristic equations and group delay characteristics as will be described later.

The binarization circuit 10 of FIG. 10 can increase a signal quality by carrying out control so as to change, for example, operating currents of the LPF 3 and BPF 4 in accordance with a frequency component of the input signal to automatically change a cutoff frequency.

Now, description will be made of characteristics of both of the LPF 3 and the BPF 4 as, for example, 4-order filters.

Characteristics of the LPF 3 are represented by the following polynomial equation (1):

$$LPF\ 3(s) = a4/(a0s^4 + a1s^3 + a2s^2 + a3s + a4) \tag{1}$$

Characteristics of the BPF 4 are represented by the following polynomial equation (2):

$$BPF\ 4(s) = a2s^2/(a0s^4 + a1s^3 + a2s^2 + a3s + a4) \tag{2}$$

Here, s denotes Laplace operator, and a0 to a4 denote coefficients.

In order to match group delay characteristics of the LPF 3 and the BPF 4, denominators (pole, characteristic equations) are set equal to each other as can be understood from the equations (1) and (2).

The adder 5 of FIG. 10 outputs a signal of a difference between output signals of LPF3 and BPF4 represented by the equations (1), (2), and frequency characteristics EQ(s) of the difference signal are represented by the following equation (3):

$$EQ(s) = LPF\ 3(s) - BPF\ 4(s) \qquad (3)$$
$$= (-a2s^2 + a4)/(a0s^4 + a1s^3 + a2s^2 + a3s + a4)$$

An output signal quality of the adder 5 greatly depends on the frequency characteristics represented by the equation (3). Thus, preferably, gain and group delay characteristics of the equation (3) are set optimal.

In the equation (3), a capability of optionally setting a coefficient a2 in a numerator of a right side member is preferable, and a circuit capable of representation by the following equation (4) is preferred:

$$EQ(s)=(-ka2s^2+a4)/(a0s^4+a1s^3+a2s^2+a3s+a4) \qquad (4)$$

Here, k·a2 denotes a coefficient.

In the equation (4), gain characteristics of the LPF 3 are represented when k·a2=0 is set to remove the output component of the BPF 4, and gain characteristics of the BPF 4 are represented when a4=0 is set to remove the output component of the LPF 3.

The equation (4) can be easily realized by adding, as shown in FIG. 10, the amplitude regulator 11 having a coefficient k between the second amplitude detector 8 and the amplitude comparator 9 (or between the BPF 4 and the second amplitude detector 8). In the example, k=4 is designed.

Figure 11A:
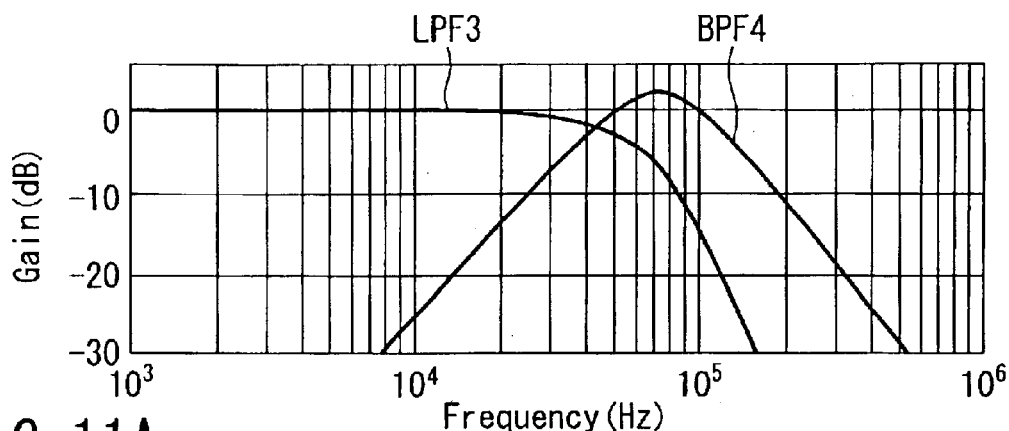
FIG. 11A is a graph showing a relation characteristic between a gain and a frequency of an LPF and a BPF of FIG. 10.
Figure 11B:
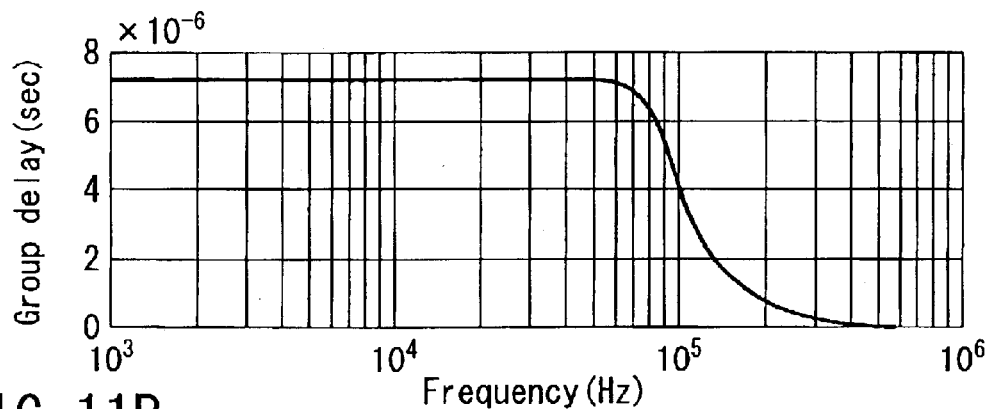
FIG. 11B is a graph showing a relation characteristic between a group delay and a frequency of the LPF and the BPF of FIG. 10.

FIGS. 11A, 11B show examples of gain and group delay frequency characteristics of the LPF 3 and the BPF 4 obtained in the equation (4), wherein a cutoff frequency is set to be 50 KHz.

Here, gain characteristics of the LPF 3 and the BPF 4 are different as shown in FIG. 11A, while group delay characteristics of the LPF 3 and the BPF 4 are similar as shown in FIG. 11B.

Figure 12A:
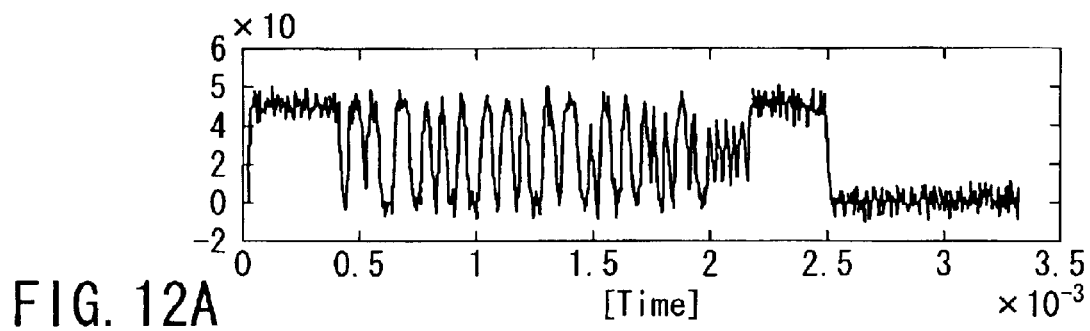
FIG. 12A is a view showing a waveform example of an input signal having a low frequency component for the LPF and the BPF of FIG. 10.
Figure 12B:
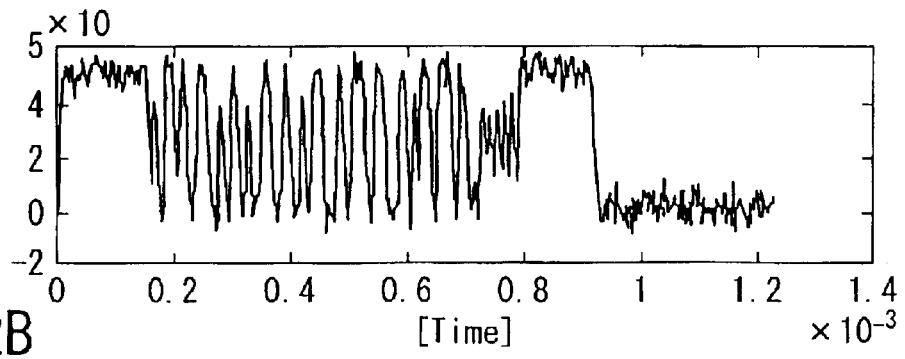
FIG. 12B is a view showing a waveform example of an input signal having a high frequency component for the LPF and the BPF of FIG. 10.

FIGS. 12A and 12B show waveform examples of two types of input signals having different frequency components as input signals of the LPF 3 and the BPF 4 having characteristics of FIGS. 11A and 11B. FIG. 12A shows a waveform where noise is superposed on a low frequency signal (highest repeated frequency=30 KHz) of a barcode signal, and FIG. 12B shows a waveform where noise is superposed on a high frequency signal (highest repeated frequency=80 KHz) of a barcode signal.

FIGS. 13A, 13B, 13C, 13D show waveform examples of output signals of the LPF 3, the BPF 4, the adder 5 and the comparator 6 when the low frequency signal of the barcode signal shown in FIG. 12A is inputted.

FIGS. 14A, 14B, 14C, 14D show waveform examples of output signals of the LPF 3, the BPF 4, the adder 5 and the comparator 6 when the high frequency signal of the barcode signal shown in FIG. 12B is inputted.

When waveforms shown in FIGS. 13A to 13D are compared with those shown in FIGS. 14A to 14D, it can be understood that waveforms are different and, for example, there is a large difference in signal amplitude between that shown in FIG. 13B and that shown in FIG. 14B. That is, in the output signal of the BPF 4 shown in FIG. 13B, there are no signal components and only noise is present. It is because a frequency component of an input signal is present in a band lower than a pass band of the BPF 4.

As apparent from the foregoing, preferably, the frequency characteristics of the LPF 3 and the BPF 4 are changed in accordance with the frequency component of the input signal. According to the binarization circuit 10 of FIG. 10, since the frequency component of the barcode signal is detected and the frequency characteristics of the LPF 3 and the BPF 4 are changed in accordance with the detected amount to enable signal processing, it is possible to greatly increase a distance between the barcode and the scanner.

If the two amplitude detectors 7, 8 and the amplitude comparator 9 are constituted to detect and compare maximum amplitude (peak value detection) of the output signals of the two variable filters 3, 4, circuitry can be simplified.

Figure 15:
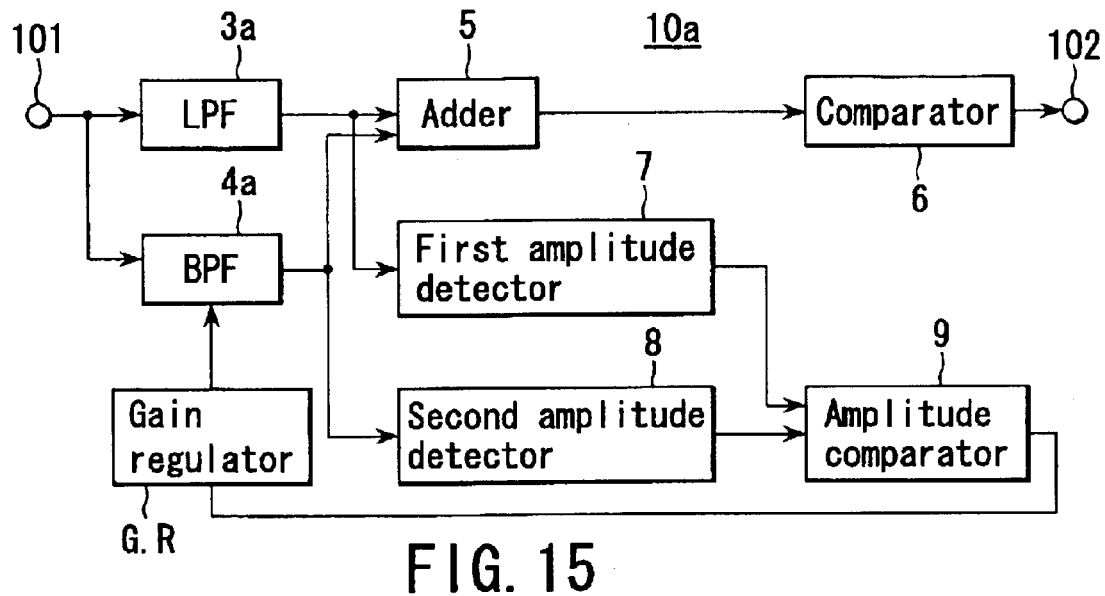
FIG. 15 is a block diagram showing another specific example of the binarization circuit of FIG. 1.

FIG. 15 shows another specific example of the binarization circuit 10 of FIG. 1.

This binarization circuit 10a is different from the binarization circuit 10 of FIG. 10 in that characteristics of the LPF 3a are fixed, and gain characteristics of the BPF 4a are adjusted by a gain regulator GR connected between the amplitude comparator 9 and a gain control terminal of the band-pass filter 4a in accordance with a control signal from the amplitude comparator 9. Other portions are similar, and thus denoted by reference numerals similar to those of FIG. 10.

Figure 16A:
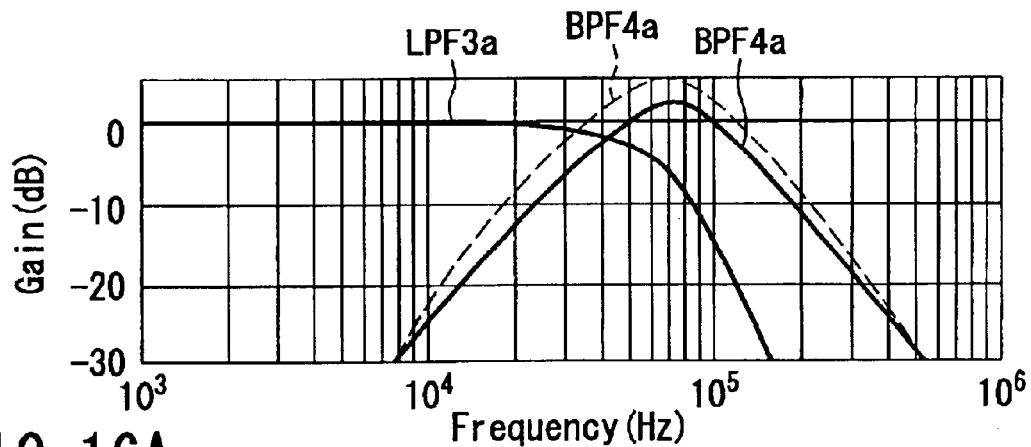
FIG. 16A is a characteristic view showing an example gain frequency characteristics of an LPF and a BPF of FIG. 15.
Figure 16B:
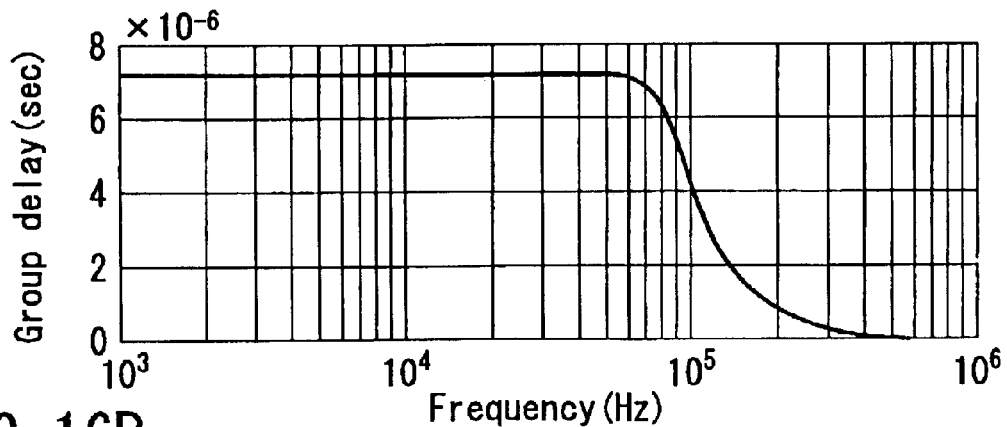
FIG. 16B is a characteristic view showing an example of group delay frequency characteristics of the LPF and the BPF of FIG. 15.

FIG. 16A shows curves of gain characteristics (fixed) of the LPF 3a and of gain characteristics of the BPF 4a shown in FIG. 15. The gain of the filter 4a is varied by an output of the gain regulator GR as indicated by solid and dashed lines. FIG. 16B shows an example of group delay characteristics of the LPF 3a and the BPF 4a. Characteristic equations of the LPF 3a and the BPF 4a are similar, and group delay characteristics are similar as shown in FIG. 16B.

That is, according to the binarization circuit of FIG. 15, since a frequency component of a barcode signal is detected and the gain characteristics of the BPF 4a are changed in accordance with the detected amount to enable signal processing by equivalently changing frequency characteristics, it is possible to greatly increase a distance between the barcode and the scanner.

Needless to say, the preamplifiers of FIG. 7, FIG. 9, and the binarization circuits of FIG. 10, FIG. 15 can be applied not only to the first embodiment but also to the embodiment of FIGS. 3 to 6 properly.

As described above, according to the barcode scanner of the embodiment of the present invention, a noise component is removed to enable effective detection of only a signal component. According to the barcode scanner of another embodiment of the present invention, the preamplifier having a high S/N can be realized. According to the barcode scanner of yet another embodiment of the present invention, it is possible to greatly improve or increase a distance between the barcode and the scanner of a barcode pattern. As a result, manufacturing yield of the barcode scanner, when the same is configured as an integrated circuit, is improved to realize a low price.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A barcode scanner comprising:
   a first oscillator to generate a pulse signal of a predetermined frequency;
   a laser driving circuit to pulse-drive a laser by the pulse signal generated from the first oscillator; and
   a signal processing section which detects a reflected light signal from a barcode scanned by an emission output of the laser to generate a binarized signal corresponding to the barcode, wherein the signal processing section includes:

a preamplifier to convert, into a voltage signal, a current-converted barcode signal outputted from a photodetector which detects the reflected light signal from the barcode scanned by the emission output of the laser, and to supply an amplified voltage signal;

a high-pass filter to remove a direct current component contained in the amplified voltage signal from the preamplifier;

a variable gain amplifier which controls an amplification gain of an output signal of the high-pass filter, thereby carrying out automatic gain control so as to set an output level almost constant, a synchronous detector to detect a pulse signal contained in an output signal of the variable gain amplifier in synchronization with the pulse signal generated from the first oscillator, and a binarization circuit to binarize an output signal of the synchronous detector.

2. A barcode scanner according to claim 1, wherein the first oscillator, the laser driving circuit and the signal processing section are formed on one semiconductor chip.

3. A barcode scanner according to claim 1, further comprising a phase compensation circuit which compensates for a phase of the pulse signal of the first oscillator to supply a phase-shifted signal to the synchronous detector in order to match phases of the phase-shifted signal and the output signal of the variable gain amplifier at two input terminals of the synchronous detector with each other.

4. A barcode scanner according to claim 3, wherein the phase compensation circuit comprises an all-pass filter of a fixed cutoff frequency.

5. A barcode scanner according to claim 3, wherein the phase compensation circuit comprises:

a variable all-pass filter to which the pulse signal of the first oscillator is inputted and in which a cutoff frequency is variable;

a 90-degree phase shifting circuit to shift a phase of an output signal of the variable all-pass filter by 90°; and a multiplier to multiply an output of the 90-degree phase shifting circuit by the output signal of the variable gain amplifier, so that the cutoff frequency of the variable all-pass filter is controlled by an output of the multiplier to bring the output of the multiplier to 0.

6. A barcode scanner according to claim 3, wherein the phase compensation circuit comprises:

a pulse generation circuit to generate a first pulse signal and a second pulse signal delayed by 90° from the first pulse signal based on the pulse signal of the first oscillator;

a first variable all-pass filter to which the first pulse signal is inputted and in which a cutoff frequency is variable, an output signal of the first variable all-pass filter being supplied to one input of the synchronous detector;

a second variable all-pass filter to which the second pulse signal is inputted and in which a cutoff frequency is variable in conjunction with the first variable all-pass filter, and a multiplier to multiply an output of the second variable all-pass filter by the output signal of the variable gain amplifier, so that the cutoff frequency of the first variable all-pass filter and that of the second variable all-pass filter are controlled by an output of the multiplier to bring the output of the multiplier to 0.

7. A barcode scanner according to claim 6, wherein the pulse generation circuit comprises a second oscillator generating a pulse signal having a frequency twice as large as the pulse signal generated from the first oscillator, a first frequency division circuit to output a first frequency-division output signal, and a second frequency division circuit to output a second frequency-division output signal having a phase of 90-degree shifted from that of the first frequency-division output signal.

8. A barcode scanner according to claim 1, wherein the preamplifier comprises:

a preamplifier section constituted of an operational amplifier in which an output signal of the photodetector is inputted to an inversion input node, and a feedback resistor connected between an output node and the inversion input node of the operational amplifier;

a reference voltage source to generate a reference voltage;

an adder to add together an output signal of the preamplifier section obtained at the output node of the operational amplifier and the reference voltage;

a voltage/current converter which generates a current in accordance with an output signal of the adder and in which an output node is connected to a non-inversion input node of the operational amplifier; and a capacitor connected between the output node of the voltage/current converter and a ground node.

9. A barcode scanner according to claim 1, wherein the preamplifier comprises:

a preamplifier section constituted of an operational amplifier in which an output signal of the photodetector is inputted to an inversion input node thereof, and a feedback resistor connected between an output node and the inversion input node of the operational amplifier;

a first reference voltage source which supplies a first reference voltage to a non-inversion input node of the operational amplifier;

an adder to add together an output signal of the preamplifier section obtained at the output node of the operational amplifier and the a second reference voltage;

a low-pass filter connected in series with the adder to take out a DC component equivalent to a DC offset voltage of an output signal of the preamplifier section; and a voltage/current converter which generates a current in accordance with an output signal of the adder or the low-pass filter and in which an output node is connected to the inversion input node of the operational amplifier.

10. A barcode scanner comprising:

a preamplifier to convert, into a voltage signal, a current-converted barcode signal outputted from a photodetector which detects a reflected light signal from a barcode scanned by an emission output of a laser, thereby outputting an amplified voltage signal;

a high-pass filter to remove a direct current component contained in the amplified voltage signal;

a variable gain amplifier which controls an amplification gain of an output signal of the high-pass filter, thereby carrying out automatic gain control so as to set an output level almost constant;

a synchronous detector to detect a pulse signal contained in an output signal of the variable gain amplifier in synchronization with a pulse signal generated from an oscillator; and a binarization circuit to binarize an output signal of the synchronous detector, wherein the preamplifier comprises:

a preamplifier section constituted of an operational amplifier in which the barcode signal of the photodetector is inputted to an inversion input node, and a feedback resistor connected between an output node and the inversion input node of the operational amplifier, a reference voltage source to generate a reference voltage, an adder to add together an output signal of the preamplifier section and the reference voltage, a voltage/current converter which generates a current in accordance with an output voltage signal of the adder and in which an output node is connected to a non-inversion input node of the operational amplifier, and a capacitor connected between the output node and a ground node of the voltage/current converter.

11. A barcode scanner comprising:

a preamplifier to convert, into a voltage signal, a current-converted barcode signal outputted from a photodetector which reads a reflected light from a barcode scanned by an emission output of a laser, thereby outputting an amplified voltage signal;

a high-pass filter to remove a direct current component contained in the amplified voltage signal;

a variable gain amplifier which controls an amplification gain of an output signal of the high-pass filter, thereby carrying out automatic gain control so as to set an output level almost constant;

a synchronous detector to detect a pulse signal contained in an output signal of the variable gain amplifier in synchronization with the pulse signal generated from an oscillator; and a binarization circuit to binarize an output signal of the synchronous detector, wherein the preamplifier comprises:

a preamplifier section constituted of an operational amplifier in which an output signal of the photodetector is inputted to an inversion input node, and a feedback resistor connected between an output node and the inversion input node of the operational amplifier;

a first reference voltage source which generates a first reference voltage and supplies the first reference voltage to a non-inversion input node of the operational amplifier;

an adder to add together an output signal of the preamplifier section and a second reference voltage;

a low-pass filter inserted into an output side or an input side of the adder to take out a DC component equivalent to a DC offset voltage of the output signal of the preamplifier section;

a second reference voltage source which generates the second reference voltage; and a voltage/current converter which generates a current in accordance with an output signal of the adder or the low-pass filter and in which an output node is connected to the inversion input node of the operational amplifier.

12. A barcode scanner comprising:

a preamplifier to convert, into a voltage signal, a current-converted barcode signal outputted from a photodetector which reads a reflected light from a barcode scanned by an emission output of a laser, thereby outputting an amplified voltage signal;

a high-pass filter to remove a direct current component contained in the amplified voltage signal;

a variable gain amplifier which controls an amplification gain of an output signal of the high-pass filter, thereby carrying out automatic gain control so as to set an output level almost constant;

a synchronous detector to detect a pulse signal contained in an output signal of the variable gain amplifier in synchronization with the pulse signal generated from an oscillator; and a binarization circuit to binarize an output signal of the synchronous detector, wherein the binarization circuit comprises:

a first variable filter configured to change frequency characteristics of the output signal of the synchronous detector;

a second variable filter configured to change frequency characteristics of the output signal of the synchronous detector;

a first amplitude detector to detect an amplitude of an output signal of the first variable filter;

a second amplitude detector to detect an amplitude of an output signal of the second variable filter;

an amplitude comparator which compares detected outputs of the first and second amplitude detectors to output a control signal in accordance with a difference between the detected amplitudes of the first and second amplitude detectors, thereby controlling the frequency characteristics of the first and second variable filters based on the control signal outputted from the amplitude comparator;

an adder to detect an amplitude difference between output signals of the first and second variable filters to deliver a difference signal; and a comparator to output a binarized signal based on the difference signal from the adder.

13. A barcode scanner according to claim 12, wherein the first variable filter is a low-pass filter which allows a low-frequency band component of the output signal from the synchronous detector to pass therethrough in accordance with the control signal from the amplitude comparator, and the second variable filter is a band-pass filter which allows a predetermined frequency band of the output signal to pass therethrough in accordance with the control signal from the amplitude comparator.

14. A barcode scanner according to claim 13, wherein the binarization circuit further comprises a gain regulator connected between a control terminal of the band-pass filter and an output end of the amplitude comparator to adjust gain characteristics of the band-pass filter in accordance with a control signal from the amplitude comparator.

15. A barcode scanner according to claim 14, wherein the preamplifier comprises:

a preamplifier section constituted of an operational amplifier in which an output signal of the photodetector is inputted to an inversion input node thereof, and a feedback resistor connected between an output node and the inversion input node of the operational amplifier;

a reference voltage source to generate a reference voltage;

an adder to add together an output signal of the preamplifier section obtained at the output node of the operational amplifier and the reference voltage;

a voltage/current converter which generates a current in accordance with an output signal of the adder and in which an output node is connected to a non-inversion input node of the operational amplifier; and a capacitor connected between the output node of the voltage/current converter and a ground node.

16. A barcode scanner according to claim 14, wherein the preamplifier comprises:

a preamplifier section constituted of an operational amplifier in which an output signal of the photodetector is inputted to an inversion input node thereof, and a feedback resistor connected between an output node and the inversion input node of the operational amplifier;

a first reference voltage source which supplies a first reference voltage to a non-inversion input node of the operational amplifier;

an adder to add together an output signal of the preamplifier section obtained at the output node of the operational amplifier and the a second reference voltage;

a low-pass filter connected in series with the adder to take out a DC component equivalent to a DC offset voltage of an output signal of the preamplifier section; and a voltage/current converter which generates a current in accordance with an output signal of the adder or the low-pass filter and in which an output node is connected to the inversion input node of the operational amplifier.

17. A barcode scanner according to claim 13, wherein characteristic equations of the low-pass filter and the band-pass filter coincide with each other.

18. A barcode scanner according to claim 13, further comprising an amplitude regulator to multiply an input signal or an output signal of the second amplitude detector by a predetermined coefficient.

19. A barcode scanner according to claim 12, wherein the two amplitude detectors and the amplitude comparator are adapted to detect and to compare maximum amplitude of output signals of the two variable filters.

20. A barcode scanner according to claim 12, wherein the preamplifier comprises:

a preamplifier section constituted of an operational amplifier in which an output signal of the photodetector is inputted to an inversion input node thereof, and a feedback resistor connected between an output node and the inversion input node of the operational amplifier;

a reference voltage source to generate a reference voltage;

an adder to add together an output signal of the preamplifier section obtained at the output node of the operational amplifier and the reference voltage;

a voltage/current converter which generates a current in accordance with an output signal of the adder and in which an output node is connected to a non-inversion input node of the operational amplifier; and a capacitor connected between the output node of the voltage/current converter and a ground node.

21. A barcode scanner according to claim 12, wherein the preamplifier comprises:

a preamplifier section constituted of an operational amplifier in which an output signal of the photodetector is inputted to an inversion input node thereof, and a feedback resistor connected between an output node and the inversion input node of the operational amplifier;

a first reference voltage source which supplies a first reference voltage to a non-inversion input node of the operational amplifier;

an adder to add together an output signal of the preamplifier section obtained at the output node of the operational amplifier and the a second reference voltage;

a low-pass filter connected in series with the adder to take out a DC component equivalent to a DC offset voltage of an output signal of the preamplifier section; and a voltage/current converter which generates a current in accordance with an output signal of the adder or the low-pass filter and in which an output node is connected to the inversion input node of the operational amplifier.

* * * * *